(12) United States Patent
O'Loughlin et al.

(10) Patent No.: US 7,380,820 B2
(45) Date of Patent: Jun. 3, 2008

(54) HEATED GAS INFLATOR

(75) Inventors: John P. O'Loughlin, Gilbert, AZ (US); Halley O. Stevens, Mesa, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 310 days.

(21) Appl. No.: 11/159,809

(22) Filed: Jun. 23, 2005

(65) Prior Publication Data

US 2006/0290108 A1    Dec. 28, 2006

(51) Int. Cl.
*B60R 21/26* (2006.01)

(52) U.S. Cl. ..................................... 280/736

(58) Field of Classification Search .............. 280/741, 280/728.3, 728.1, 736, 737
See application file for complete search history.

(56) References Cited

U.S. PATENT DOCUMENTS

| | | | |
|---|---|---|---|
| 2,850,291 A | 9/1958 | Ziccardi | |
| 3,180,373 A | 4/1965 | Hebenstreit | |
| 3,450,414 A | 6/1969 | Kobori | |
| 3,588,142 A | 6/1971 | Gorman | |
| 3,655,217 A | 4/1972 | Johnson | |
| 3,674,059 A | 7/1972 | Stephenson | |
| 3,723,205 A | 3/1973 | Scheffee | |
| 3,806,153 A | 4/1974 | Johnson | |
| 3,813,007 A | 5/1974 | Doin et al. | |
| 3,822,895 A | 7/1974 | Ochiai | |
| 3,868,124 A | 2/1975 | Johnson | |
| 3,895,821 A | 7/1975 | Schotthoefer et al. | |
| 3,966,226 A | 6/1976 | Roth | |
| 4,220,087 A | 9/1980 | Posson | |
| 4,791,805 A | 12/1988 | Gates | |
| 4,878,690 A | 11/1989 | Cunningham | |
| 4,948,439 A | 8/1990 | Poole et al. | |
| 5,031,932 A | 7/1991 | Frantom et al. | |
| 5,033,772 A | 7/1991 | Frantom et al. | |
| 5,076,607 A | 12/1991 | Woods et al. | |
| 5,092,237 A | 3/1992 | Beaufay et al. | |
| 5,230,532 A | 7/1993 | Blumenthal et al. | |
| 5,344,186 A | 9/1994 | Bergerson et al. | |
| 5,348,344 A | 9/1994 | Blumenthal et al. | |
| 5,350,192 A | 9/1994 | Blumenthal | |
| 5,394,908 A | 3/1995 | Maness | |
| 5,464,247 A | 11/1995 | Rizzi et al. | |
| 5,482,315 A | 1/1996 | Chandler, Jr. et al. | |
| 5,529,333 A | 6/1996 | Rizzi et al. | |
| 5,590,906 A | 1/1997 | Faigle et al. | |
| 5,609,361 A | 3/1997 | Bergerson et al. | |
| 5,609,362 A | 3/1997 | Sparks et al. | |
| 5,632,505 A | 5/1997 | Saccone et al. | |
| 5,655,790 A | 8/1997 | Faigle et al. | |
| 5,660,413 A | 8/1997 | Bergerson et al. | |
| 5,662,353 A | 9/1997 | Bergerson et al. | |

(Continued)

*Primary Examiner*—Faye M. Fleming
(74) *Attorney, Agent, or Firm*—Tarolli, Sundheim, Covell & Tummino LLP

(57) ABSTRACT

An inflator (40) for inflating an inflatable vehicle occupant protection device (14) includes structure that defines a chamber (220) and inflation fluid stored in the chamber. The inflation fluid includes in mixture a fuel gas, an oxidizer gas, and an inert gas mixture. The inflator (40) also includes an actuator for initiating a combustion reaction between the fuel gas and the oxidizer gas. The inert gas mixture includes at least two different inert gases and has a composition selected to produce desired performance characteristics of the inflator (40).

30 Claims, 5 Drawing Sheets

U.S. PATENT DOCUMENTS

| | | |
|---|---|---|
| 5,664,804 A | 9/1997 | Saccone |
| 5,673,934 A | 10/1997 | Saccone et al. |
| 5,683,108 A | 11/1997 | Blumenthal et al. |
| 5,690,357 A | 11/1997 | Cuevas |
| 5,695,215 A | 12/1997 | Headley et al. |
| 5,711,547 A | 1/1998 | Blumenthal et al. |
| 5,786,543 A | 7/1998 | Staudhammer et al. |
| 5,847,314 A | 12/1998 | Blumenthal et al. |
| 5,863,066 A | 1/1999 | Blumenthal |
| 5,863,067 A | 1/1999 | Blumenthal et al. |
| 5,879,025 A | 3/1999 | Blumenthal |
| 5,893,583 A | 4/1999 | Blumenthal et al. |
| 5,897,137 A | 4/1999 | Al-Amin et al. |
| 6,007,097 A | 12/1999 | Rink et al. |
| 6,024,379 A | 2/2000 | Blumenthal et al. |
| 6,029,995 A | 2/2000 | Fink |
| 6,062,599 A | 5/2000 | Forbes et al. |
| 6,098,548 A | 8/2000 | Rink et al. |
| 6,155,600 A | 12/2000 | Reynolds et al. |
| 6,186,540 B1 | 2/2001 | Edgren |
| 6,217,065 B1 | 4/2001 | Al-Amin et al. |
| 6,244,623 B1 | 6/2001 | Moore et al. |
| 6,254,129 B1 | 7/2001 | Rink et al. |
| 6,273,462 B1 | 8/2001 | Faigle et al. |
| 6,332,404 B1 | 12/2001 | Rink et al. |
| 6,412,811 B1 | 7/2002 | Campbell et al. |
| 6,431,595 B1 | 8/2002 | Swann et al. |
| RE37,843 E * | 9/2002 | Blumenthal et al. ........ 280/737 |
| 6,584,911 B2 | 7/2003 | Bergerson et al. |
| 6,607,214 B2 | 8/2003 | Blakemore et al. |
| 6,634,302 B1 | 10/2003 | Rink et al. |
| 6,672,616 B2 | 1/2004 | Jonsson et al. |
| 6,726,243 B2 | 4/2004 | Dinsdale et al. |
| 6,805,376 B2 | 10/2004 | Mizuno |
| 2003/0098572 A1 | 5/2003 | Katsuda et al. |

\* cited by examiner

HEATED GAS INFLATOR

TECHNICAL FIELD

The present invention relates to an inflator for inflating an inflatable vehicle occupant protection device.

BACKGROUND OF THE INVENTION

It is known to provide an inflator for inflating an inflatable vehicle occupant protection device. One particular type of inflator is a heated gas inflator in which a volume of inflation fluid in the form of a combustible mixture of gases is stored under pressure in a gas storage chamber. The heated gas inflator is actuatable to ignite the inflation fluid to create a flow of heated inflation fluid that is discharged through an outlet of the inflator.

SUMMARY OF THE INVENTION

The present invention relates to an inflator for inflating an inflatable vehicle occupant protection device. The inflator includes structure that defines a chamber and inflation fluid stored in the chamber. The inflation fluid includes, in mixture, a fuel gas, an oxidizer gas, and an inert gas mixture. The inflator also includes an actuator for initiating a combustion reaction between the fuel gas and the oxidizer gas. The inert gas mixture includes at least two different inert gases and has a composition selected to produce desired performance characteristics of the inflator.

The present invention also relates to a method for producing an inflator for inflating an inflatable vehicle occupant protection device. The method includes the step providing a structure that defines a chamber for receiving pressurized inflation fluid. The method also includes the step of providing inflation fluid for storage in the chamber. The inflation fluid includes, in mixture, a fuel gas, an oxidizer gas, and an inert gas mixture including comprising at least two different inert gases. The method includes the further step of selecting the composition of the inert gas mixture to produce desired performance characteristics of the inflator.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF EMBODIMENTS

Figure 1:
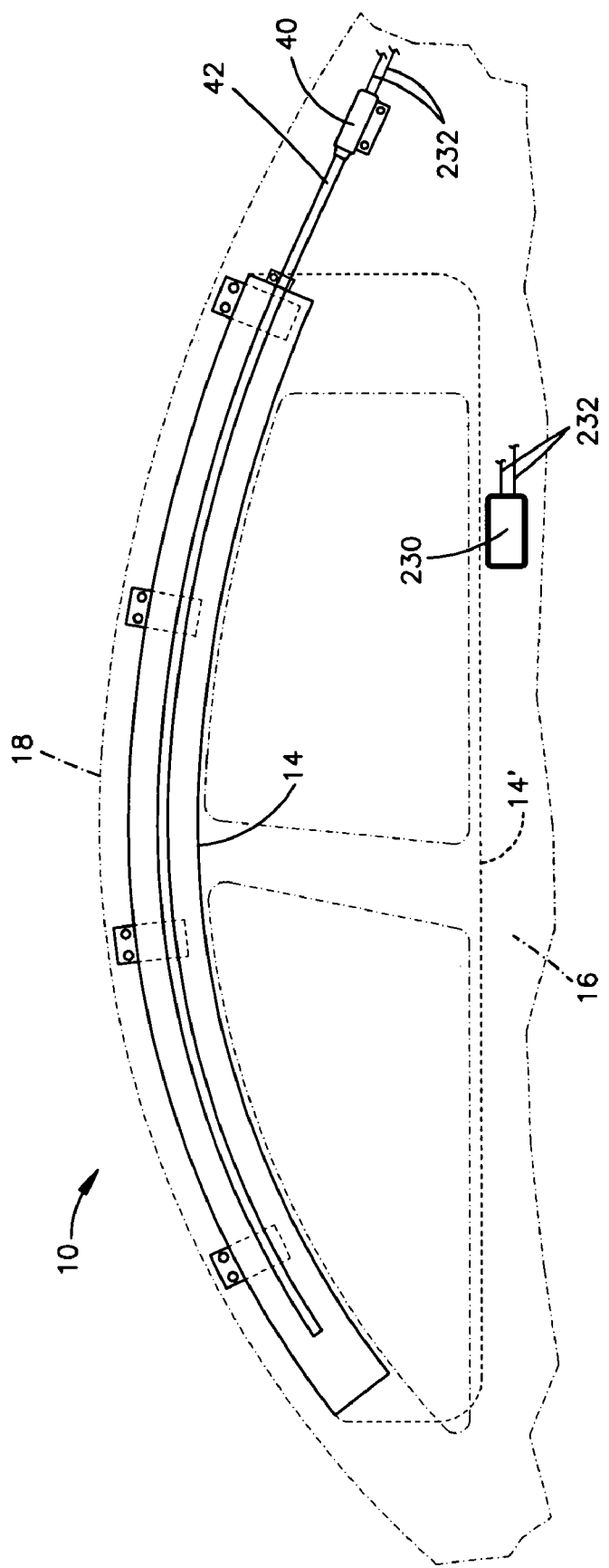
FIG. 1 illustrates an apparatus for helping to protect an occupant of a vehicle, according to an embodiment of the present invention.

Representative of the present invention, an apparatus 10 helps to protect an occupant (not shown) of a vehicle 12. In the embodiment illustrated in FIG. 1, the apparatus 10 includes an inflatable vehicle occupant protection device in the form of an inflatable curtain 14. The apparatus 10 could include an alternative type of inflatable vehicle occupant protection device, such as an inflatable air bag, an inflatable seat belt, an inflatable knee bolster, an inflatable headliner, or a knee bolster operated by an inflatable air bag.

The inflatable curtain 14 has a stored position adjacent the intersection of a side structure 16 and a roof 18 of the vehicle 12. The inflatable curtain 14 is inflatable from the stored position to a deployed position (shown in dashed lines at 14') extending away from the roof 18 along the side structure 16. In the deployed position, the inflatable curtain 14 is positioned between the side structure 16 and any occupants (not shown) of the vehicle 12.

The inflatable curtain 14 can be constructed of any suitable material, such as nylon (e.g., woven nylon 6-6 yarns). The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 40. The inflator 40 is actuatable to provide inflation fluid for inflating the inflatable curtain 14. In the embodiment illustrated in FIG. 1, the inflator 40 is connected in fluid communication with the inflatable curtain 14 through a fill tube 42. Alternatively, the fill tube 42 could be omitted, in which case the inflator 40 could be connected directly to the inflatable curtain 14.

Figure 2:
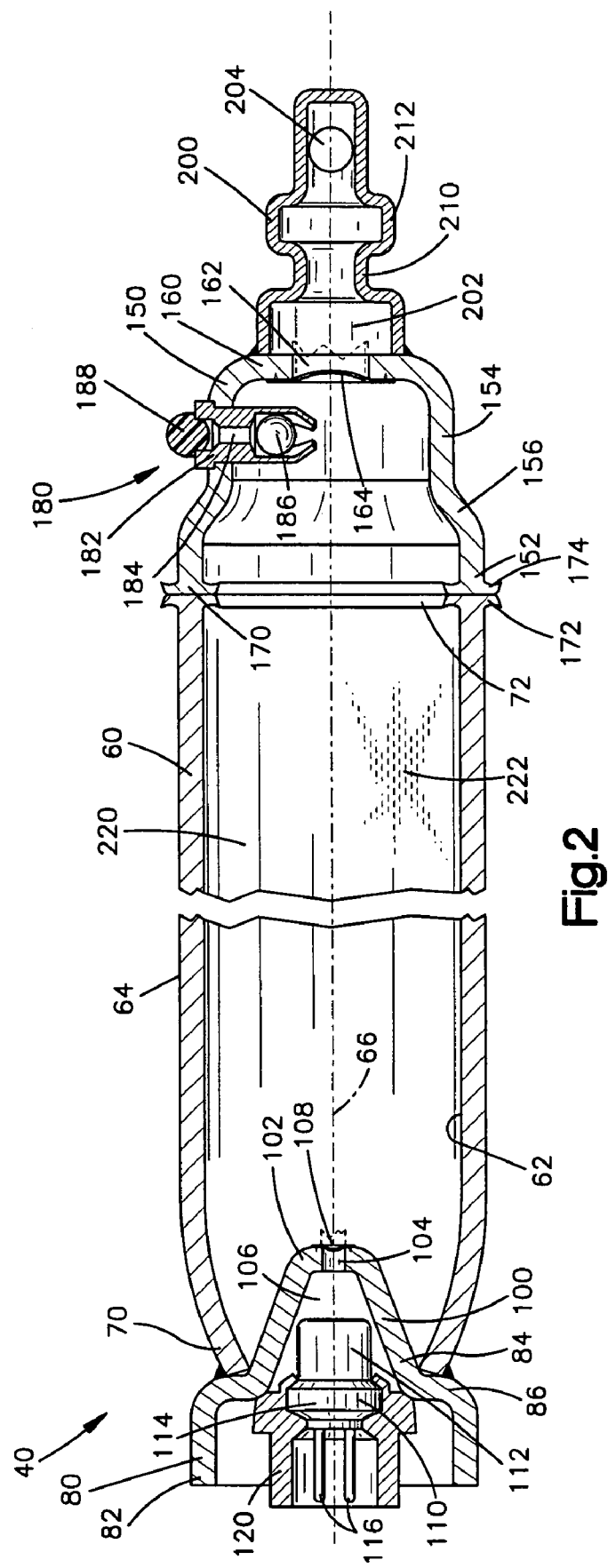
FIG. 2 is a sectional view of an inflator of the apparatus of FIG. 1.

The inflator 40 may be configured in a variety of manners. An example configuration of the inflator 40 is shown in FIG. 2. In the example of FIG. 2, the inflator 40 includes a body portion 60, an ignitor end cap 80, and a discharge end cap 150. The body portion 60 has an elongated cylindrical configuration and is constructed of a high strength material, such as tubular steel, aluminum, or other suitable metals or metal alloys. The body portion 60 includes a cylindrical inner surface 62 that defines an inside diameter of the body portion and an outer surface 64 that defines an outside diameter of the body portion. The inner and outer surfaces 62 and 64 are centered on a longitudinal axis 66. The body portion 60 has a length measured along the axis 66. The body portion 60 of the inflator 40 also has opposite first and second open ends 70 and 72, respectively. The first open end 70 is swaged, thus reducing its diameter from the remainder of the body portion 60.

The ignitor end cap 80 is connected to the first open end 70 of the body portion 60. The ignitor end cap 80 is constructed of a material similar or identical to the body portion 60, e.g., steel, aluminum, or other suitable metals or metal alloys. The ignitor end cap 80 may be formed in any suitable manner, such as by stamping the ignitor end cap from a single piece of material.

The ignitor end cap 80 includes a cylindrical outer wall portion 82 that has a diameter about equal to that of the non-swaged portion of the body portion 60. The ignitor end cap 80 also includes an ignitor support portion 84 positioned radially inward of the outer wall portion 82. An annular shoulder portion 86 extends from the outer wall portion 82 to the ignitor support portion 84. The outer wall portion 82 and ignitor support portion 84 are aligned with each other axially.

In the assembled condition of the inflator 40, the ignitor support portion 84 is aligned with the body portion 60 along the axis 66. The shoulder portion 86 is positioned engaging the open end portion 70 of the body portion 60 and is connected to the open end portion by suitable means, such as welding.

The ignitor support portion 84 includes a side wall 100 and an end wall 102. The side wall 100 and end wall 102 help define an ignition chamber 106 of the ignitor support portion 84. The end wall 102 includes an ignitor jet nozzle opening 104 that is centered on the axis 66 and that provides fluid communication with the ignition chamber 106. A rupturable closure member 108, such as a burst disk is connected to the end wall 102 and spans across the ignitor jet nozzle opening 104.

The ignitor end cap 80 supports an ignitor 110 in the ignitor support portion 84. The ignitor 110 may comprise a pyrotechnic device, such as a squib. The ignitor 110 includes a cap portion 112 that contains a volume of pyrotechnic material (not shown). The ignitor 110 also includes a support portion 114 and leads 116 through which an electrical current may be supplied to actuate the ignitor by igniting the pyrotechnic material.

An ignitor support piece 120 helps secure the ignitor 110 in the ignitor support portion 84 of the ignitor end cap 80. The ignitor support piece 120 includes an inner surface configured to mate with the support portion 114 of the ignitor 110. As shown in FIG. 2, the ignitor support piece 120 may be crimped onto the ignitor 110. The ignitor support piece 120 also has an outer surface configured to engage the ignitor support portion 84 of the ignitor end cap 80. The ignitor support piece 120 is connected to the ignitor end cap 80 by means, such as welding, to secure the ignitor 110 in the ignitor support portion 84. When the ignitor 110 is secured in the ignitor support portion 84, the cap portion 112 containing the pyrotechnic material is positioned in the ignition chamber 106.

The discharge end cap 150 is connected to the second open end 72 of the body portion 60. The discharge end cap 150 is constructed of a material similar or identical to the body portion 60, e.g., steel, aluminum, or other suitable metals or metal alloys. The discharge end cap 150 may be formed in any suitable manner, such as by stamping the discharge end cap from a single piece of material.

The discharge end cap 150 includes a cylindrical first wall portion 152 that has a diameter about equal to that of the body portion 60. The discharge end cap 150 also includes a cylindrical second wall portion 154 that is axially aligned with the first wall portion 152. The second wall portion 154 has a diameter that is smaller than the diameter of the first wall portion 152. A curved shoulder portion 156 connects the first wall portion 152 to the second wall portion 154.

The discharge end cap 150 also includes an end wall 160 that extends radially inward from an end of the second wall portion 154 opposite the first wall portion 152. A central discharge passage 162 extends through the end wall 160. A rupturable closure member 164, such as a burst disk, is connected to the end wall 160 and spans across the discharge passage 162.

The discharge end cap 150 is aligned with the body portion 60 along the axis 66. A terminal end portion 170 of the first wall portion 152 is connected to the second open end 72 of the body portion 60 by suitable means, such as welding. For example, the terminal end portion 170 can be connected to the second open end 72 by a friction weld 172, which produces an annular weld curl 174 where the discharge end cap 150 and body portion 60 engage each other.

The inflator 40 also includes a fill assembly 180 for introducing inflation fluid to the inflator 40. The fill assembly 180 includes a housing 182 that extends through and is secured to the second wall portion 154 of the discharge end cap 150. The housing 182 includes a passage 184 through which gas is directed into the inflator 40.

A check ball 186, supported by the housing 182, permits gas flow into the inflator 40 and helps block fluid from flowing out of the inflator 40 through the passage 184. The check ball 186 may have a polymeric construction. In this instance, the check ball 186 may be placed in the housing 182 and the inflator and housing may be heated in order to extrude the stop ball into the housing passage 184. To further block gas flow from the inflator 40 through the passage 184, a metal fill ball 188 may be welded to the housing 182.

The inflator 40 further includes a discharge nozzle 200 for discharging inflation fluid from the inflator. The discharge nozzle 200 is constructed of a high strength material, such as steel, aluminum, or other suitable metals or metal alloys. The discharge nozzle 200 may be formed in any suitable manner, such as by stamping the discharge nozzle from a single piece of material. The discharge nozzle 200 may be formed separately from the discharge end cap 150 and secured to the end wall 160 of the discharge end cap by means such as welding. Alternatively, the discharge nozzle 200 may be formed as a single piece of material with the discharge end cap 150, as shown in FIG. 2. This may be done, for example, by stamping the discharge nozzle 200 and discharge end cap 150 as a single piece of material.

The discharge nozzle 200 has a central passage 202 in fluid communication with the discharge passage 162. The passage 202 is aligned with the axis 66. The discharge nozzle 200 has outlet openings 204 in fluid communication with the passage 162. The outlet openings 204 may be arranged in a thrust neutral configuration in which the openings extend perpendicular to the axis 66 in opposite directions from each other.

The discharge nozzle 200 includes multiple cylindrical sections of varying diameters. These cylindrical sections form an annular groove 210 and an annular collar 212 of the discharge nozzle 200. The groove 210 and collar 212 may cooperate with a connector (not shown) for connecting the discharge nozzle 200 to the fill tube 42.

The body portion 60, ignitor end cap 80, and discharge end cap 150 help define a chamber 220 for storing inflation fluid 222 under pressure. According to the present invention, the inflation fluid 222 comprises a mixture of gases including a fuel gas, an oxidizer gas, and an inert gas or gasses. The inflation fluid 222 thus comprises a combustible mixture of gases.

Referring to FIG. 1, upon sensing the occurrence of an event for which inflation of the inflatable curtain is desired, such as a side impact, a vehicle rollover, or both, a sensor 230 provides an actuation signal to the inflator 40 via lead wires 232. Referring to FIG. 2, the lead wires 232 provide the actuation signal to the 116 of the ignitor 110. The ignitor 110 is actuated in response to receiving the actuation signal.

When the ignitor 110 is actuated, the pyrotechnic material in the cap 120 ignites, causing the cap to rupture. Combustion of the pyrotechnic material causes the burst disk 108 to rupture.

Upon rupture of the burst disk 108, the ignitor jet nozzle opening 112 directs the flame produced by the ignitor 110 into the chamber 220. The flame ignites the inflation fluid 222, causing a combustion reaction between the fuel gas and the oxidizer gas. This combustion reaction creates a flame which produces heat that heats inflation fluid in the chamber 220. As the inflation fluid is heated, pressure builds in the chamber 220. A wave (e.g., a pressure or shock wave) travels along the length of the inflator 40 from the ignitor end cap 80 to the outlet end cap 150 and ruptures the burst disk 164, which permits the heated inflation fluid 222 to exit the chamber 220 via the through the discharge nozzle 200. The heated inflation fluid 222 is directed from the inflator 40 toward the inflatable curtain 14 via the fill tube 42 (FIG. 1).

Inflation criteria for the inflatable curtain 14 dictates required inflation performance characteristics for the inflator 40. For an inflatable curtain 14 actuatable in response to a side impact, a vehicle rollover, or both, the inflation criteria for the inflatable curtain 14 may include first impact criteria and rollover duration criteria for the curtain. For an inflatable curtain 14 actuatable in response to a side impact only, the inflation criteria for the inflatable curtain 14 may include first impact criteria only. First impact criteria relates to inflating the inflatable curtain 14 to the deployed position and to a predetermined pressure (first impact pressure) within a predetermined amount of time (first impact time) so as to help protect an occupant in a vehicle side impact event. Rollover duration criteria relates to maintaining inflation fluid pressure (rollover pressure) in the inflatable curtain 14 for a predetermined amount of time (rollover duration) after curtain deployment so as to help protect an occupant through the duration of a vehicle rollover event.

The inflation criteria for the inflatable curtain 14 may vary depending on factors, such as curtain configuration (e.g., inflated thickness or volume) and the architecture of the vehicle. More particularly, for the first impact criteria, the first impact pressure, the first impact time, or both, may vary. For the rollover duration criteria, the rollover pressure, rollover duration, or both may vary.

For example, the first impact criteria may dictate that the inflatable curtain 14 is inflated to the deployed position and to a first impact pressure of 6-8 psig within a first impact time of 20 milliseconds after actuation of the inflator 40. The rollover duration criteria may dictate that the inflatable curtain 14 remains pressurized to a rollover pressure of at least 50% of the first impact pressure (i.e., 3-4 psig) for a rollover duration of at least six seconds after actuation of the inflator 40. As another example, rollover duration criteria may dictate that the inflatable curtain 14 remains pressurized to a rollover pressure of at least 50% of the first impact pressure for a rollover duration of at least two seconds after actuation of the inflator 40.

According to the present invention, the size of the inflator 40, sometimes referred to as the "package size" of the inflator, may be minimized to help reduce manufacturing costs. A reduction in the package size of the inflator 40 can help reduce the raw materials required to produce the inflator and the packaging and shipping costs associated with delivering the inflator. A reduction in the package size of the inflator 40 may also help accommodate more flexibility for installation within the limited space provided in the vehicle 12. Those skilled in the art, however, will appreciate that the degree to which the package size of the inflator 40 can be reduced may be limited by a variety of factors, such as the amount of inflation fluid required to be delivered to the inflatable curtain 14, the physical properties of the inflation fluid, and the pressure limitations of the inflator structure.

The configuration of the present invention may help reduce the package size of the inflator 40 in several ways. Heating the inflation fluid through combustion of the fuel gas may help reduce the amount (i.e., number of moles) of inflation fluid required to inflate and pressurize the inflatable curtain 14 in accordance with the first impact criteria. This is because, as the inflation fluid is heated, it undergoes thermal expansion. As a result, the inflator 40 may satisfy the first impact criteria for the inflatable curtain 14 with a reduced amount of inflation fluid.

Also, the inflation fluid may be stored in the inflator 40 under a high storage pressure, such as up to 10,000 psig, or more. For a given amount of inflation fluid, as storage pressure increases, the volume of inflation fluid is reduced. As a result, the package size of the inflator 40 may be reduced.

Further, configuring the inflator 40 to ignite the inflation fluid at one end of the inflator and discharge the inflation fluid from the opposite end may help increase the amount of heat added to the inflation fluid by the combustion reaction. In this configuration, the burst disk 164 is ruptured due to an increase in the inflation fluid pressure in the chamber 220, which is achieved through heating the inflation fluid via the combustion reaction. Therefore, the inflator 40 may not discharge the inflation fluid until after the combustion reaction adds a substantial amount of heat to the inflation fluid. This capability of adding more heat increases the pressure of the inflation fluid which, as described above, may help reduce the amount of fluid required and thus help reduce the package size of the inflator 40.

Those skilled in the art will appreciate that the construction of the apparatus 10 may be configured to prevent pressure losses due to inflation fluid leakage. The sealing of the inflatable curtain 14, in combination with sealing at the connections between the curtain and the inflator 40 and fill tube 42, may be configured to help prevent any significant leakage and resulting pressure drops in the curtain. In view of this, it will be appreciated that pressure drops in the inflatable curtain 14 within the time frame dictated by the inflation criteria are most likely attributed to cooling of the inflation fluid in the curtain.

It was determined through testing that the effects of cooling within the time frame dictated by the rollover duration criteria can be overcome or compensated by controlling the gas exit temperature of the inflator 40. As used herein, "gas exit temperature" refers to the temperature of the inflation fluid as it exits the inflator 40. As the temperature differential between the gas exit temperature and the ambient temperature increases, the inflation fluid in the inflatable curtain 40 will cool more rapidly, causing a more rapid pressure drop in the curtain. Thus, by controlling the gas outlet temperature of the inflator 40 to limit this differential, pressure losses in the inflatable curtain 14 due to cooling can be maintained at acceptable levels.

Testing has shown that, for ambient temperatures in the range of −30° C. to +85° C., a gas exit temperature for the inflator of about 250° C. or less is sufficient to meet the six second rollover duration criteria set forth above in the first example. In this testing, a 10% leak rate is assumed as a safety factor in order to account for any unexpected leakage. Thus, in the first example, if the inflator 40 is configured such that the gas exit temperature of the inflation fluid is 250° C. or less, and the first impact criteria are met, the rollover duration criteria will also be met.

Testing has also shown that, for ambient temperatures in the range of −30° C. to +85° C., a gas exit temperature for the inflator of about 350° C. or less is sufficient to meet the two second rollover duration criteria set forth above in the second example. In this testing, a 10% leak rate is assumed as a safety factor in order to account for any unexpected leakage. Thus, in the second, if the inflator 40 is configured such that the gas exit temperature of the inflation fluid is about 350° C. or less and the first impact criteria are met, the rollover duration criteria will also be met.

There are a variety of performance characteristics of the inflator 40 that help determine whether the inflator will meet the inflation criteria for a particular configuration of the inflatable curtain 14. Among these characteristics are the burst disk rupture time, the inflator gas exit temperature, the mass flow rate of the inflation fluid discharged by the inflator, and the chamber pressure of the inflator.

The burst disk rupture time refers to the amount of time that elapses between actuation of the inflator 40 (i.e., actuation of the ignitor 110) and rupture of the burst disk 164. The burst disk rupture time can be an indicator of the amount of time that elapses between actuation of the inflator 40 and the initial discharge of inflation fluid into the fill tube 42 and into the inflatable curtain 14.

As mentioned above, the inflator gas exit temperature refers to the temperature of the inflation fluid as it exits the inflator 40. The inflator gas exit temperature affects the initial temperature and pressure to which the inflatable curtain 14 is inflated. The rate at which the inflation fluid pressure in the inflatable curtain 14 decays due to heat transfer varies directly with the temperature differential between the inflator gas exit temperature and the ambient temperature. If the gas exit temperature is too high, the inflatable curtain 14 may undergo too great a pressure loss due to cooling and thus may not meet the rollover duration criteria for the inflatable curtain 14.

The mass flow rate of the inflation fluid discharged by the inflator 40 affects the time required to deploy and pressurize the inflatable curtain 14. In order to deploy and pressurize the inflatable curtain 14 in accordance with the first impact criteria, a given amount (i.e., a given number of moles) of inflation fluid must be delivered to the curtain within the first impact time in order to reach the first impact pressure. This amount of inflation fluid may depend on variety of factors, such as the volume of the inflatable curtain 14, the inflation fluid composition, and the gas outlet temperature of the inflator 40. If the discharge mass flow rate of the inflator 40 is too low, the first impact time and pressure dictated by the first impact criteria may not be met. If the discharge mass flow rate of the inflator 40 is too high, the inflatable curtain 14 may be damaged during deployment.

The chamber pressure of the inflator 40 refers to the inflation fluid pressure in the chamber 220 during the combustion reaction between the fuel and oxidizer gases. The chamber pressure is related to the temperature of the inflation fluid, which is determined by the amount of heat absorbed by the inflation fluid during the combustion reaction. The chamber pressure affects the discharge mass flow rate of the inflator 40.

The inflator performance characteristics set forth above can be controlled through the physical configuration of the inflator 40 and the composition of the inflation fluid. One physical attribute of the inflator 40 that can be configured to help control its performance characteristics is the length-to-diameter (L/D) ratio of the inflator 40. The L/D ratio of the inflator 40 refers to the ratio of the effective length of the gas storage chamber 220 to the inside diameter of the chamber.

For a given amount and composition of inflation fluid, as the L/D ratio increases, the wave that ruptures the burst disk takes longer to travel from the initiator end cap 80 to the outlet end cap 150. As a result, as the L/D ratio increases, the burst disk rupture time for the inflator 40 increases. Since the burst disk rupture time increases, the fuel gas in the chamber 220 combusts for a greater amount of time before inflation fluid is discharged from the inflator 40. This increases the amount of heat required to increase the internal pressure up to the burst disk rupture strength. Thus, as the L/D ratio increases, the gas exit temperature of the inflation fluid discharged from the inflator 40 will actually decrease due to the larger volume of gas. Conversely, as the L/D ratio of the inflator 40 decreases, the burst disk rupture time decreases but the gas exit temperature of the inflation fluid discharged from the inflator will actually increase due to the smaller volume of gas.

Another physical attribute of the inflator 40 that can be configured to help control its performance characteristics is the size or diameter of the outlet orifice of the inflator 40. The "outlet orifice" refers to the opening of the inflator 40 that is most restrictive and thus controls inflation fluid flow out of the inflator. For example, in the embodiment shown in FIG. 2, the discharge passage 162, annular groove 210, or outlet openings 204 may serve as the outlet orifice of the inflator 40. For purposes of description, assume that the discharge passage 162 is controlling and thus forms the outlet orifice of the inflator 40.

For a given amount and composition of inflation fluid stored in an inflator having given dimensions, the orifice diameter affects the discharge mass flow rate of the inflator 40. As the orifice diameter increases, the discharge mass flow rate of the inflator 40 increases. As the orifice diameter decreases, the discharge mass flow rate of the inflator 40 decreases.

The composition of the inflation fluid also helps control the performance characteristics of the inflator 40. According to the present invention, the inflation fluid comprises a fuel gas, an oxidizer gas, and an inert gas. The fuel gas may be hydrogen or a hydrocarbon gas, such as methane, ethane, propane, butane, an alcohol, or an ether. The oxidizer gas may be oxygen or air. The inert gas includes helium (He) and may also include other inert gases, such as argon (Ar), nitrogen (N), neon (Ne), krypton (Kr), xenon (Xe), and radon (Rn). In the case where air is the oxidizer gas, the inert gas may also include any inert gases found in the air (e.g., nitrogen and argon). The composition of the inflation fluid is adjusted by altering the amounts of fuel gas, oxidizer gas, and inert gas in the inflation fluid. These amounts are referred to herein in terms of the molar percentage (molar %) of the inflation fluid accounted for by each particular gas.

The fuel gas and oxidizer gas, forming the reaction that adds heat to the inflation fluid, affect the gas outlet temperature and discharge mass flow rate of the inflator 40. Adjustment of the molar percentage of the fuel gas, oxidizer gas, or both can thus help control the gas outlet temperature and discharge mass flow rate of the inflator 40.

The inflation fluid composition can be stoichiometric, fuel rich, or oxidizer rich. In a stoichiometric inflation fluid composition, the fuel gas and oxidizer gas compositions are selected such that both are consumed by the combustion reaction. In a fuel rich inflation fluid composition, there is fuel gas in excess of the oxidizer gas available for consumption. Therefore, in a fuel rich inflation fluid composition, the amount of oxidizer gas can be tailored to help control the combustion reaction. This helps control the amount of heat added to the inflation fluid, which helps control the gas outlet temperature and the discharge mass flow rate of the inflator 40.

In an oxidizer rich inflation fluid composition, there is oxidizer gas in excess of the fuel gas available for combustion. Therefore, in an oxidizer rich inflation fluid composition, the amount of fuel gas can be tailored to help control the combustion reaction. This helps control the amount of heat added to the inflation fluid, which helps control the gas outlet temperature and the discharge mass flow rate of the inflator 40.

The inert gas absorbs heat from the combustion reaction between the fuel gas and oxidizer gas. The physical properties of the particular inert gas determine the heat absorption and flow characteristics of the inert gas. According to the present invention, the inert gas may comprise a combination of different inert gases. The respective molar percentages of these different inert gases can be adjusted to help control the gas outlet temperature and discharge mass flow rate of the inflator 40.

Table 1 illustrates relevant physical properties of three example inert gases, namely helium, argon, and nitrogen:

TABLE 1

| Element | Molecular Weight | Specific Heat $(C_p)$* cal/g-°K | Thermal Conductivity (k) W/cm·K | Density (ρ)** g/cm$^3$ |
|---|---|---|---|---|
| Helium (He) | 4.00260 | 1.24 | .00152 | .000179 |
| Argon (Ar) | 39.948 | 0.124 | .0001772 | .001782 |
| Nitrogen (N$_2$) | 28.0134 | 0.249 | .0002598 | .001251 |

*@25° C and 1 atmosphere.
**@20° C.

The molecular weight of the inert gas helps determine how readily the gas will flow through the outlet orifice of the inflator 40. For an outlet orifice having a given diameter, a gas having a relatively low molecular weight will flow through the outlet orifice more readily than a gas having a relatively high molecular weight. For example, argon has a molecular weight of about ten times that of helium. Thus, for a given outlet orifice, argon would require a substantial increase in pressure, temperature, or both, to achieve the discharge mass flow rate of helium. For this same outlet orifice, nitrogen, having a molecular weight that falls between those of argon and helium, would require an increase in pressure, temperature, or both, to achieve the discharge mass flow rate of helium, but not as large an increase as argon requires. Those skilled in the art will thus appreciate that the molar percentages of the different inert gases in the inflation fluid can be adjusted to tailor the overall molecular weight of the inert gases to help control the discharge mass flow rate of the inflator 40.

The specific heat of the inert gas defines the amount of heat required to raise the temperature of the gas, and thus determines the gas outlet temperature of the inflator 40. Those skilled in the art will thus appreciate that the molar percentages of the different inert gases in the inflation fluid can be adjusted to tailor the overall specific heat of the inert gases to help control the gas outlet temperature of the inflation fluid discharged from the inflator 40.

The thermal diffusivity of a gas relates to the rate at which heat is conducted through the gas. Thermal diffusivity (α) is related to the specific heat $(C_p)$, thermal conductivity (k), and density (ρ) of the gas according to the following equation:

$$\alpha = \frac{k}{\rho C_p}$$

Based on the values set forth above in Table 1, helium has the highest thermal diffusivity followed by argon and then nitrogen.

For an inflation fluid having a particular composition, the rate of the combustion reaction between the fuel gas and oxidizer gas is affected by the thermal diffusivity of the inert gas in the composition. As the thermal diffusivity of the inert gases in the inflation fluid increases, the combustion rate of the reaction between the fuel gas and oxidizer gas increases. The combustion rate helps determine the amount of heat added to the inflation fluid before the fluid is discharged from the inflator 40. Since the heat added to the inflation fluid causes a pressure increase that results in rupturing the burst disk, those skilled in the art will appreciate that tailoring the thermal diffusivity of the inert gas by adjusting the inert gas composition can help control the burst disk rupture time.

According to the present invention, the performance characteristics of the inflator 40 are tailored to meet inflation criteria for the inflatable curtain 14. The dimensions of the inflator 40 and the amount of inflation fluid (number of moles) are initially selected in accordance with the volume of the inflatable curtain 14 and any size requirements dictated by the architecture of the vehicle 12.

The dimensions selected for the inflator 40 may vary. For example, the inflator 40 may have a diameter in the range of 25-60 millimeters with an L/D ratio between 5:1 and 13:1. As an example, the architecture of the vehicle 12 may dictate that the inflator have a diameter of 30-45 millimeters. Within this range, a nominal diameter of the inflator may be selected, for example, as 33 millimeters. This being the case, the range of L/D ratios dictate that the inflator 40, i.e., the storage chamber 220 may have a length of 165-429 millimeters.

The length of the inflator may be selected in accordance with the inflatable volume of the inflatable curtain 14 which, in combination with the initial pressure dictated by the first impact criteria, determines the number of moles of gas that the inflator must deliver. For example, an inflatable curtain having an inflatable volume of 20-25 liters may require delivery of 0.9-1.2 moles of inflation fluid in order to meet the first impact criteria for the curtain. As another example, an inflatable curtain having an inflatable volume of 26-33 liters may require delivery of 1.2-1.8 moles of inflation fluid in order to meet the first impact criteria for the curtain. As another example, an inflatable curtain having an inflatable volume of 40-60 liters may require delivery of 2.2-3.0 moles of inflation fluid in order to meet the first impact criteria for the curtain.

In one particular example, an inflatable curtain 14 may have an inflatable volume of about 50 liters. If the first impact criteria dictate an initial pressure of 6-8 psig, it may be determined that 2.25 moles of gas need to be delivered to the curtain 14. A predetermined target gas storage pressure may be up to 10,000 psig, or more, such as 6,750 psig @25° C. Knowing these values, the length of the inflator 14 can be determined such that placing the determined number of moles of inflation fluid in the storage chamber will result in a 6,750 psig storage pressure @25° C.

As described above, determining the package size of the inflator 40 may involve cost considerations. For example, determining the inflator diameter from within the 30-45 millimeter range described above may be influenced by cost considerations. For instance, the availability of common stock materials in a particular diameter versus a custom diameter may affect material costs and thereby influence the selected diameter. Also, for instance, the required inflator length dictated by a particular diameter may affect the amount of scrap incurred when using standard length materials. Thus, for example, in this determination, the diameter and length of the inflator may be selected as the cheapest combination that will store the required number of moles of gas and that the vehicle architecture will accommodate.

The outlet orifice may be configured to have a nominal diameter that is initially selected from within a predetermined range, such as 4-10 millimeters. For example, a 5 millimeter outlet orifice diameter may be selected.

Having initially configured the inflator 40 as described above, the performance characteristics of the inflator can be tailored by altering the gas composition of the inflation fluid. This is not to say that the size of the inflator 40 (e.g., diameter, L/D ratio, storage pressure, outlet orifice) cannot also be altered to adjust the performance characteristics of the inflator 40. Rather, the initial configuration of the inflator is selected while considering the desired performance characteristics, minimizing costs, and reducing package size. Once the physical configuration of the inflator 40 is determined, the performance characteristics of the inflator can be tailored by adjusting the gas composition of the inflation fluid.

In an example composition of the inflation fluid, the fuel gas is hydrogen ($H_2$), the oxidizer gas is oxygen ($O_2$), and the inert gas is a mixture of helium (He) and argon (Ar). The inflation fluid may be fuel rich, oxidizer rich, or stoichiometric. A stoichiometric reaction between hydrogen and oxygen consumes two moles of hydrogen for each mole of oxygen. A fuel rich hydrogen and oxygen composition would include hydrogen in excess of this two-to-one molar ratio. An oxidizer rich hydrogen and oxygen composition would include oxygen in excess of this two-to-one molar ratio.

A fuel rich or oxidizer rich hydrogen and oxygen composition may be desirable for repeatability of the performance characteristics of the inflator 40. In a stoichiometric hydrogen and oxygen composition, dynamic variables encountered during the actuation of the inflator 40 may cause the amount of hydrogen consumed by the combustion reaction to vary. This may cause the amount of heat added to the inflation fluid to vary, which could impact inflator performance repeatability. In a hydrogen and oxygen composition that is fuel rich or oxidizer rich, however, the excess fuel or oxidizer allows for complete consumption of the available oxidizer or fuel, respectively. This helps make the combustion reaction more predictable and helps improve inflator performance repeatability.

In the example composition of the inflation fluid, the inflation fluid composition is 5-15 molar % hydrogen, 4-25 molar % oxygen. In this composition, the balance of the inflation fluid would be the inert gas mixture of helium and the argon. In this example, the inflation fluid composition includes up to 90 molar % helium and up to 90 molar % argon. Within these ranges, the inflation fluid composition may include 40-88 molar % helium and 3-20 molar % argon.

For the above example, the first impact criteria may require that the inflatable curtain 14 is inflated to the initial pressure of 6-8 psig within 20 milliseconds after actuation of the inflator. The rollover duration criteria may require a pressure loss of no more than 50% within the first six seconds after actuation of the inflator 40. As a result, in this example, the rollover duration criteria dictate that six seconds after actuation of the inflator 40, the pressure in the inflatable curtain 14 is to be 3-4 psig or more.

In selecting the specific hydrogen and oxygen composition for the inflation fluid, one particular consideration is the burst disk rupture time. The hydrogen and oxygen composition is selected to provide enough energy to reliably open the burst disk 164 within a desired time, e.g., 2-3 milliseconds, after actuation of the initiator 110 over a wide ambient temperature band, such as between −30° C., and +85° C. In the present example, it may be determined that an oxidizer rich inflation fluid composition including 12 molar % hydrogen and 15 molar % oxygen will achieve a combustion reaction that produces enough energy to achieve the desired burst disk rupture time of 2-3 milliseconds over the −30° C. to +85° C. temperature band.

Achieving the burst disk rupture time of 2-3 milliseconds leaves 17-18 milliseconds to deliver the volume of inflation fluid necessary to meet the first impact criteria for the inflatable curtain 14. According to the present invention, the molar percentages of helium and argon in the inflation fluid can be adjusted to tailor the inflator performance characteristics of the inflator 40 to meet the first impact criteria without adjusting the hydrogen and oxygen composition of the inflation fluid.

Figure 3:
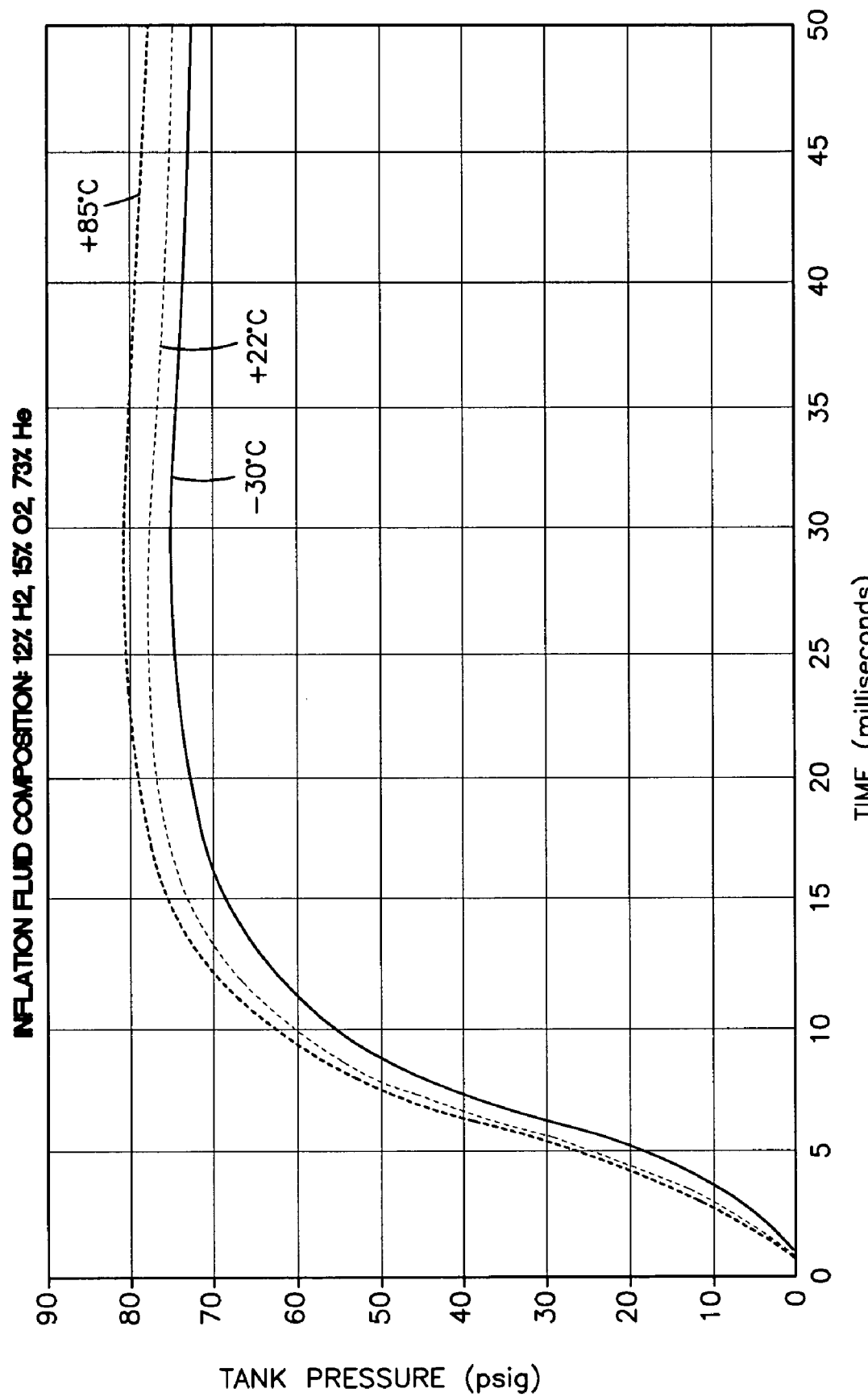
FIG. 3 is a chart illustrating performance characteristics for one inflation fluid composition of the inflator.
Figure 4:
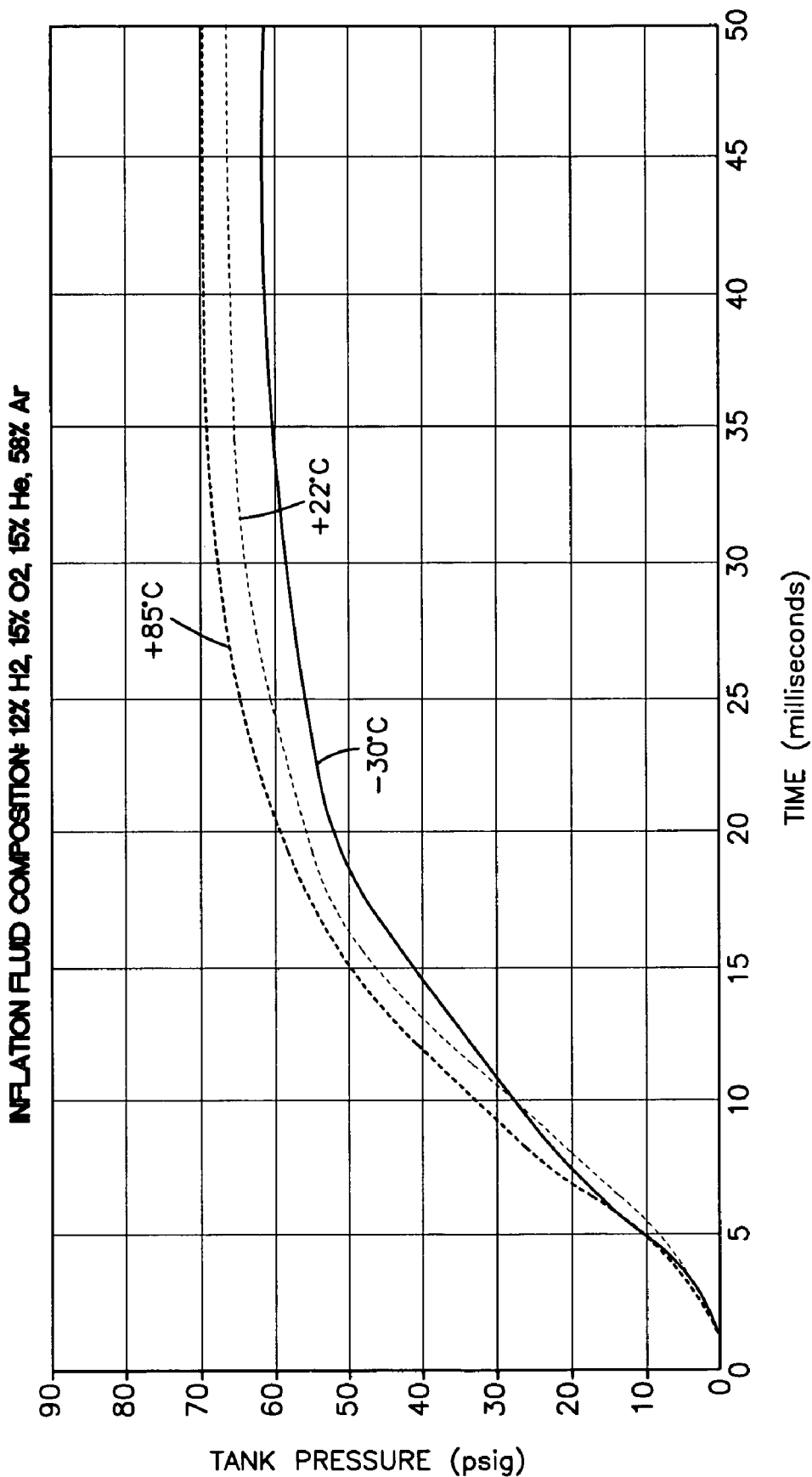
FIG. 4 is a chart illustrating performance characteristics for another inflation fluid composition of the inflator.

FIGS. 3 and 4 illustrate the results of tests used to measure the performance characteristics of two different inflation fluid compositions. More particularly, the test results shown in FIGS. 3 and 4 illustrate how different inert gas compositions affect the performance characteristics of a particular inflator configuration. In these examples, the only characteristic that varies is the molar percentages of the inert gas in the inflation fluid. All other factors remain the same.

In the examples of FIGS. 3 and 4, the 2.25 moles of inflation fluid are stored at a nominal fill pressure of 6750 psig at 22° C. in an inflator having an outside diameter of 35 mm, a volume of 150 cc and an outlet orifice diameter of 5.00 mm. To perform a particular test, an inflator is discharged into a one cubic foot (28.3 liter) tank. This is commonly referred to as a "tank pressure test." For each iteration of the tank pressure test, when the inflator is discharged, the pressure in the tank is recorded.

The tank used for the tank pressure test is a steel vessel that contains air at the various ambient conditions prior to discharging the inflator. The tank pressure test thus provides an indication only of inflator performance characteristics and not actual curtain pressurization. Because the volume of inflation fluid in the inflator is selected knowing the volume of the inflatable curtain, curtain pressurization is not pertinent to the tank pressure test. What is pertinent is whether the burst disk rupture time will be acceptable, whether the inflation fluid will be delivered to the inflatable curtain in accordance with the first impact criteria, and whether the gas outlet temperature is at or lower the determined threshold. Also pertinent is whether the inflation fluid composition will deliver the inflation fluid to the curtain too rapidly.

The tank pressure test is repeated for each inflation fluid composition at different ambient temperatures. In the examples of FIGS. 3 and 4, each inflation fluid composition was tested at three different ambient temperatures. One test was conducted at −30° C. to test inflator performance in extreme cold ambient conditions. Another test was conducted at +85° C. to test inflator performance in extreme hot ambient conditions. Another test was conducted at +22° C. to test inflator performance at normal ambient conditions.

For each tank pressure test, the inflator performance characteristics of interest are burst disk rupture time, peak tank pressure, gas exit temperature, and tank pressure slope. Burst disk rupture time is indicated by the time it takes to detect an increase in tank pressure. Since each tested inflator configuration discharges the same amount of inflation fluid (2.25 moles) into the tank, differences in the measured tank pressures can be attributed to differences in the gas exit temperature. More specifically, peak tank pressure increases as gas exit temperature increases.

Tank pressure slope refers to the slope of the pressure curves in FIGS. 3 and 4. Tank pressure slope is related the discharge mass flow rate of the inflator 40. As the discharge mass flow rate increases, the tank pressure slope increases. The tank pressure slope thus illustrates how quickly the inflator 40 will deliver the required volume of inflation fluid to the inflatable curtain 14.

Referring to FIG. 3, the 2.25 moles of inflation fluid in the inflator had the following composition 12 molar % hydrogen, 15 molar % oxygen, and 73 molar % helium. As shown in FIG. 3, at each of the different ambient temperatures, a rise in tank pressure indicative of burst disk rupture occurs at around 1 millisecond after actuation of the inflator. For this inflation fluid composition, there is a relatively steep or high tank pressure slope, which results in rapid tank pressurization to a relatively high peak tank pressure. For the tests of FIG. 3, the resulting tank pressurization curves indicate uniform, repeatable performance of the inflator over the −30° C. to +85° C. temperature band.

Referring to FIG. 4, the 2.25 moles of inflation fluid in the inflator had the following composition 12 molar % hydrogen, 15 molar % oxygen, 15 molar % helium, and 58 molar % argon. As shown in FIG. 4, at each of the different ambient temperatures, a rise in tank pressure indicative of burst disk rupture occurs at about 1-2 milliseconds after actuation of the inflator. For this inflation fluid composition, the tank pressure slope is less steep or lower than that of FIG. 3. As a result, tank pressurization is less rapid and results in a lower peak tank pressure than that achieved in FIG. 3. For the tests of FIG. 4, the resulting tank pressurization curves also indicate uniform, repeatable performance of the inflator over the −30° C. to +85° C. temperature band.

As illustrated by the results shown in FIGS. 3 and 4, the performance characteristics for a particular inflator configuration can be adjusted significantly by altering the composition of the inert gas in the inflation fluid. In the example, of FIG. 4, the addition of argon to the inflation fluid resulted in an increase in the overall molecular weight, specific heat, and thermal diffusivity of the inert gas in the inflation fluid composition. Because of this, the inflation fluid absorbed less heat from the hydrogen and oxygen combustion reaction. As a result, the burst disk rupture time showed a slight increase, while remaining within the 2-3 millisecond threshold. Also, as a result, the inflator 40 exhibited a reduced discharge mass flow rate, which produced the reduced tank pressure slope and peak tank pressures exhibited in FIG. 4.

Figure 5:
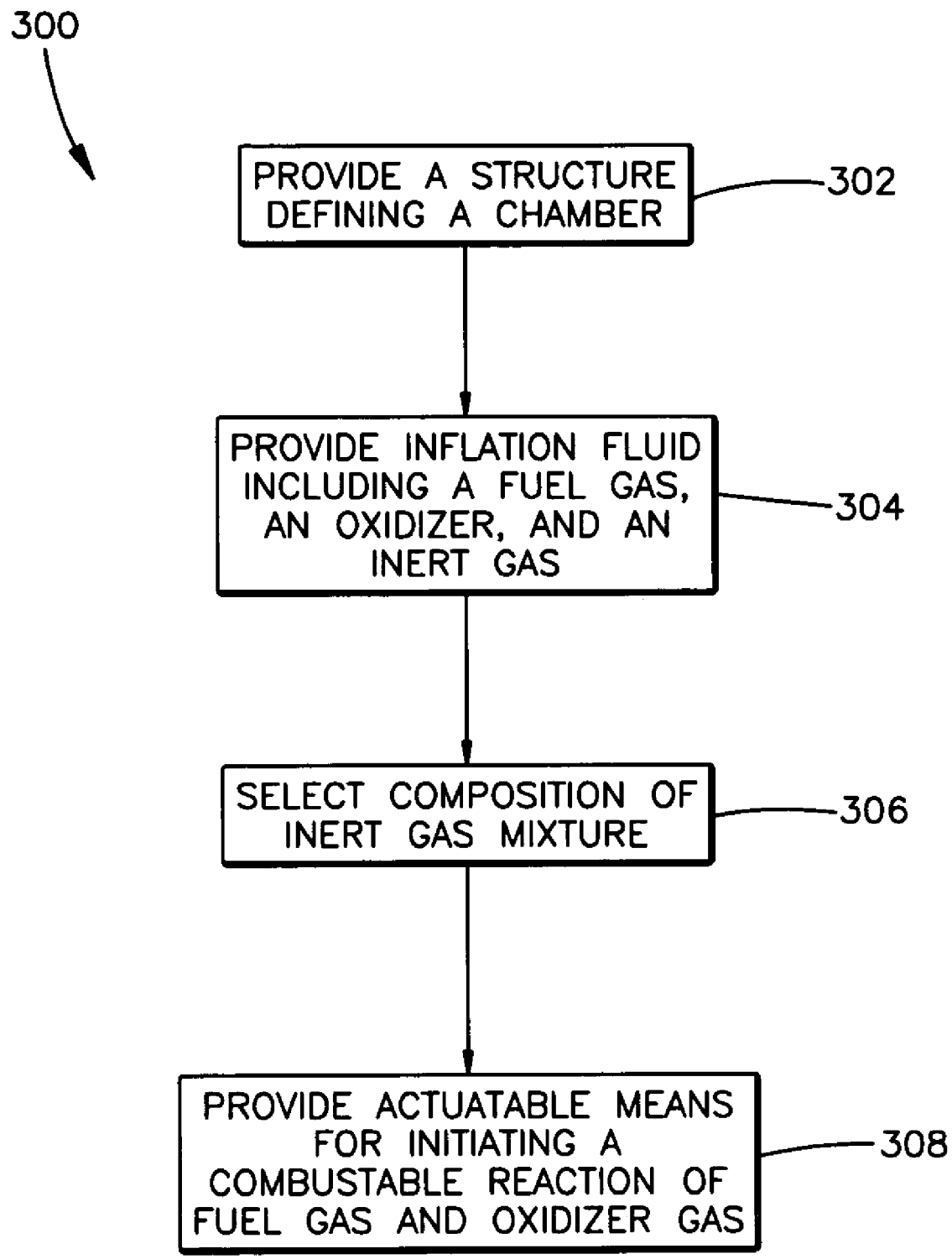
FIG. 5 is a flow chart illustrating a method in accordance with the present invention.

From the above description, it will be appreciated that the present invention also relates to a method for producing the inflator 40. Referring to FIG. 5, the method 300 includes the step 302 of providing a structure, e.g., the body portion 60, ignitor end cap 80, and discharge end cap 150 (see FIG. 2) to help define a chamber 220 for receiving pressurized inflation fluid. At step 304, inflation fluid is provided for storage in the chamber 220. As described above, the inflation fluid includes in mixture a fuel gas (e.g., hydrogen or a hydrocarbon), an oxidizer gas (e.g., oxygen or air), and an inert gas mixture comprising at least two different inert gases (e.g., at least two selected from helium, argon, nitrogen, neon, krypton, xenon, and radon). At step 306, the composition of the inert gas mixture is selected to produce desired performance characteristics (e.g., at least one of burst disk rupture time, chamber pressure, gas outlet temperature, and discharge mass flow rate) of the inflator 40. The method 300 may also include the step 308 of providing actuatable means (e.g., the actuator 110) for initiating a combustion reaction between the fuel gas and the oxidizer gas.

The step 306 of selecting the composition of said inert gas mixture may include selecting an inert gas composition that results in a molecular weight of the inert gas mixture that helps produce the desired performance characteristics of the inflator. Step 306 may also include selecting a composition of the inert gas mixture that helps produce a desired discharge mass flow rate of the inflator. Step 306 may also include selecting a composition of the inert gas mixture that results in a specific heat of the inert gas mixture that helps produce the desired performance characteristics of the inflator. Step 306 may also include selecting a composition of the inert gas mixture that helps produce a desired gas outlet temperature of the inflator. Step 306 may further include selecting the composition of the inert gas mixture to help control the amount of heat transferred to the inflation fluid from the combustion reaction.

The step 304 of providing inflation fluid may include providing the fuel gas, oxidizer gas, and inert gas mixture as predetermined molar percentages of the inflation fluid. Step 304 may also include adjusting the composition of the inert gas mixture to produce the desired performance characteristics of the inflator without changing the predetermined molar percentages of the fuel gas, oxidizer gas, and inert gas mixture.

The inflator 40 of the illustrated embodiment is an example configuration. The configuration of the inflator 40 could depart from that shown in the illustrated embodiment without departing from the spirit of the present invention. For example, in the illustrated embodiment, the inflator 40 has an elongated configuration with the components arranged along the axis 66 with the ignitor at one end and the inflation fluid outlet 200 at the opposite end. The inflator 40 could, however, have alternative configurations. For instance, the ignitor 110 may not be aligned along the axis 66 and may be positioned at any position along the length of the inflator 40 and at any orientation relative to the axis.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An inflator for inflating an inflatable vehicle occupant protection device, said inflator comprising:
   structure defining a chamber;
   inflation fluid stored in said chamber, said inflation fluid comprising in mixture a fuel gas, an oxidizer gas, and an inert gas mixture; and
   actuatable means for initiating a combustion reaction between said fuel gas and said oxidizer gas;
   said inert gas mixture comprising at least two different inert gases and having a composition selected to produce desired performance characteristics of the inflator;
   wherein said fuel gas makes up a fixed molar percentage of said inflation fluid, said oxidizer gas makes up a fixed molar percentage of said inflation fluid, and said inert gas mixture makes up a fixed molar percentage of said inflation fluid, the composition of said inert gas mixture being adjustable to produce said desired performance characteristics of the inflator without changing said fixed molar percentages of said fuel gas, said oxidizer gas, and said inert gas mixture.

2. The inflator recited in claim 1, wherein the selected composition gives said inert gas mixture a molecular weight that helps produce said desired performance characteristics of said inflator.

3. The inflator recited in claim 2, wherein the molecular weight resulting from the selected composition of said inert gas mixture helps produce a desired discharge mass flow rate of said inflator.

4. The inflator recited in claim 3, wherein the desired discharge mass flow rate is sufficient to deliver a volume of inflation fluid sufficient to inflate the inflatable vehicle occupant protection device to a predetermined pressure within a predetermined amount of time after actuation of the inflator.

5. The inflator recited in claim 1, wherein the selected composition gives said inert gas mixture a specific heat that helps produce said desired performance characteristics of said inflator.

6. The inflator recited in claim 5, wherein the specific heat resulting from the selected composition of said inert gas mixture helps produce a desired gas outlet temperature of said inflator.

7. The inflator recited in claim 6, wherein the desired gas outlet temperature is a temperature below which the inflatable vehicle occupant protection device will remain inflated above a predetermined pressure for a predetermined amount of time after actuation of the inflator.

8. The inflator recited in claim 5, wherein the specific heat provided by the selected composition of said inert gas mixture helps produce a desired inflator chamber pressure of said inflator.

9. The inflator recited in claim 1, wherein said performance characteristics of the inflator comprise at least one of the burst disk rupture time, a chamber pressure, a gas outlet temperature, and a discharge mass flow rate.

10. The inflator recited in claim 1, wherein said fixed molar percentage of said fuel gas and said fixed molar percentage of said oxidizer gas are selected to produce a desired burst disk rupture time over a predetermined temperature band.

11. The inflator recited in claim 10, wherein said burst disk rupture time is within 3 milliseconds after actuation of said inflator.

12. The inflator recited in claim 10, wherein said predetermined temperature band is −30° C. to +85° C.

13. The inflator recited in claim 1, wherein the composition of said inert gas mixture is selected to help control the amount of heat transferred to said inflation fluid from said combustion reaction.

14. The inflator recited in claim 1, wherein said inert gases are selected from the group consisting of helium, argon, nitrogen, neon, krypton, xenon, and radon.

15. The inflator recited in claim 1, wherein said inert gases include helium and at least one other inert gas selected from the group consisting of argon, nitrogen, neon, krypton, xenon, and radon.

16. The inflator recited in claim 1, further comprising a burst disk for blocking inflation fluid flow out of said chamber, said combustion reaction adding heat to said inflation fluid which pressurizes said inflation fluid and causes said burst disk to rupture and release said inflation fluid to flow out of said chamber.

17. The inflator recited in claim 1, wherein said fuel gas comprises at least one of hydrogen and a hydrocarbon selected from the group consisting of methane, ethane, propane, an alcohol, and an ether.

18. The inflator recited in claim 1, wherein said oxidizer gas comprises at least one of oxygen and air.

19. The inflator recited in claim 1, wherein said inflation fluid comprises 5-15 molar % hydrogen, 4-25 molar % oxygen, up to 90 molar % helium and up to 90 molar % argon. Within these ranges, the inflation fluid composition may include 40-88 molar % helium and up to 3-20 molar % argon.

20. The inflator recited in claim 1, wherein said inflation fluid comprises 5-15 molar % hydrogen, 4-25 molar % oxygen, 40-88 molar % helium, and 3-20 molar % argon.

21. The inflator recited in claim 1, wherein said inflation fluid is stored in said inflator at up to about 10,000 psig.

22. A method for producing an inflator for inflating an inflatable vehicle occupant protection device, said method comprising the steps of:
   providing a structure defining a chamber for receiving pressurized inflation fluid;
   providing inflation fluid for storage in said chamber, said inflation fluid comprising in mixture a fuel gas, an oxidizer gas, and an inert gas mixture comprising at least two different inert gases; and
   selecting the composition of said inert gas mixture to produce desired performance characteristics of the inflator;
   wherein said fuel gas makes up a fixed molar percentage of said inflation fluid, said oxidizer gas makes up a fixed molar percentage of said inflation fluid, and said inert gas mixture makes up a fixed molar percentage of said inflation fluid, the composition of said inert gas mixture being adjustable to produce said desired performance characteristics of the inflator without changing said fixed molar percentages of said fuel gas, said oxidizer gas, and said inert gas mixture.

23. The method recited in claim 22, further comprising the step of providing actuatable means for initiating a combustion reaction between said fuel gas and said oxidizer gas.

24. The method recited in claim 22, wherein said step of selecting the composition of said inert gas mixture comprises the step of selecting a composition of said inert gas mixture that results in a molecular weight of said inert gas mixture that helps produce said desired performance characteristics of the inflator.

25. The method recited in claim 22, wherein said step of selecting the composition of said inert gas mixture comprises the step of selecting a composition of said inert gas mixture that helps produce a desired discharge mass flow rate of the inflator.

26. The method recited in claim 22, wherein said step of selecting the composition of said inert gas mixture comprises the step of selecting a composition of said inert gas mixture that results in a specific heat of said inert gas mixture that helps produce said desired performance characteristics of the inflator.

27. The method recited in claim 26, wherein said step of selecting the composition of said inert gas mixture comprises the step of selecting a composition of said inert gas mixture that helps produce a desired gas outlet temperature of the inflator.

28. The method recited in claim 22, wherein said step of providing inflation fluid comprises the steps of:
   providing said fuel gas as a fixed molar percentage of said inflation fluid;
   providing said oxidizer gas as a fixed molar percentage of said inflation fluid;
   providing said inert gas mixture as a fixed molar percentage of said inflation fluid; and
   adjusting the composition of said inert gas mixture to produce said desired performance characteristics of the inflator without changing said fixed molar percentages of said fuel gas, said oxidizer gas, and said inert gas mixture.

29. The method recited in claim 22, wherein said step of selecting the composition of said inert gas mixture comprises the step of selecting the composition of said inert gas mixture to help control the amount of heat transferred to said inflation fluid from said combustion reaction.

30. An inflator for inflating an inflatable vehicle occupant protection device, said inflator comprising:
 structure defining a chamber;
 inflation fluid stored in said chamber, said inflation fluid comprising in mixture a fuel gas, an oxidizer gas, and an inert gas mixture; and
 actuatable means for initiating a combustion reaction between said fuel gas and said oxidizer gas;
 said inert gas mixture comprising at least two different inert gases and having a composition selected to produce desired performance characteristics of the inflator;
 wherein said fuel gas makes up a fixed molar percentage of said inflation fluid, said oxidizer gas makes up a fixed molar percentage of said inflation fluid, and said inert gas mixture makes up a fixed molar percentage of said inflation fluid, the composition of said inert gas mixture being adjustable to produce said desired performance characteristics of the inflator without changing said fixed molar percentages of said fuel gas, said oxidizer gas, and said inert gas mixture;
 wherein said fixed molar percentage of said fuel gas and said fixed molar percentage of said oxidizer gas are selected to produce a desired burst disk rupture time within 3 milliseconds after actuation of said inflator over a predetermined temperature band.

* * * * *